United States Patent [19]

Ambrose et al.

[11] Patent Number: 5,095,069
[45] Date of Patent: Mar. 10, 1992

[54] INTERNALLY-CURABLE WATER-BASED POLYURETHANES

[75] Inventors: Ronald R. Ambrose, Allison Park; David A. Diehl, Pittsburgh; Leon A. Perez, Ross Township; all of Pa.

[73] Assignee: PPG Industries, Inc., Pittsburgh, Pa.

[21] Appl. No.: 575,024

[22] Filed: Aug. 30, 1990

[51] Int. Cl.$^5$ .................... C08J 3/00; C08K 3/20; C08L 75/00
[52] U.S. Cl. .................... 524/591; 524/839; 528/61; 528/64; 528/75
[58] Field of Search ............ 524/591, 839; 528/61, 528/64, 75

[56] References Cited

U.S. PATENT DOCUMENTS

| | | | |
|---|---|---|---|
| 3,297,745 | 1/1967 | Fekete et al. | 260/471 |
| 3,509,234 | 4/1970 | Burlant et al. | 260/859 |
| 3,748,294 | 7/1973 | Kershaw et al. | 260/22 |
| 3,759,809 | 9/1973 | Carlick et al. | 204/159 |
| 3,775,377 | 11/1973 | Kokawa | 260/77 |
| 3,782,961 | 1/1974 | Takahashi et al. | 96/115 |
| 4,046,729 | 9/1977 | Scriven et al. | 260/29 |
| 4,066,591 | 1/1978 | Scriven et al. | 260/29 |
| 4,070,323 | 1/1978 | Vanderhoff et al. | 260/29 |
| 4,088,498 | 5/1978 | Faust | 96/115 |
| 4,128,537 | 12/1978 | Markiewitz | 528/49 |
| 4,131,602 | 12/1978 | Hodakowski et al. | 528/49 |
| 4,147,679 | 4/1979 | Scriven et al. | 260/29 |
| 4,176,099 | 11/1979 | Pampouchidis et al. | 260/18 |
| 4,277,380 | 7/1981 | Williams et al. | 260/18 |
| 4,312,798 | 1/1982 | Kovacs | 260/29 |
| 4,380,604 | 4/1983 | Neuhaus et al. | 524/873 |
| 4,390,662 | 6/1983 | Ando et al. | 525/28 |
| 4,496,675 | 1/1985 | Hille et al. | 524/77 |
| 4,609,706 | 9/1986 | Bode et al. | 525/7 |
| 4,701,480 | 10/1987 | Markusch et al. | 524/591 |
| 4,742,118 | 5/1988 | Parekh | 524/591 |
| 4,760,111 | 7/1988 | Ambrose et al. | 528/75 |
| 4,775,732 | 10/1988 | Lapin | 528/49 |
| 4,782,129 | 11/1988 | Moschovis et al. | 528/49 |
| 4,822,685 | 4/1989 | Perez et al. | 428/423 |
| 4,829,122 | 5/1989 | Pedain et al. | 524/591 |
| 4,829,123 | 5/1989 | Shigematsu et al. | 525/28 |

FOREIGN PATENT DOCUMENTS

3134721A1  6/1982  Fed. Rep. of Germany.
3315690A   4/1983  Fed. Rep. of Germany.

*Primary Examiner*—Paul R. Michl
*Assistant Examiner*—Patrick Niland
*Attorney, Agent, or Firm*—Dennis G. Millman; Godfried R. Akorli

[57] ABSTRACT

There is provided herein a stable water-based internally-crosslinkable unsaturated polyurethane composition containing unsaturated groups comprising an allyl group and another ethylenically unsaturated group that can react with the allyl group to form a solvent resistant coating.

28 Claims, No Drawings

INTERNALLY-CURABLE WATER-BASED POLYURETHANES

BACKGROUND OF THE INVENTION

1. Field of the Invention

The present invention relates to water-based polyurethane compositions. More specifically, the present invention relates to stable water-based internally-crosslinkable polyurethane compositions containing crosslinkable unsaturated groups.

2. Brief Description of the Prior Art

Water-based polyurethane compositions in the form of solutions, dispersions or emulsions are generally known in the art. One approach to providing water-based polyurethane compositions has been through the use of emulsifiers. The resultant polyurethane emulsions generally suffer from the disadvantages of instability of the polyurethane compositions and water sensitivity of the resultant films. Another approach to providing water-based polyurethane compositions has been through the use of base-neutralized ionizable groups, such as salts of carboxylic acid. The introduction of carboxylic acid into polyurethane polymers can be a problem because the carboxylic acid can react with isocyanate starting materials. This reaction can lead to the reduction in the content of the carboxylic acid of the polyurethane polymers, the destabilization of the polyurethane polymers and the formation of undesirable side products.

Nonetheless, given the environmental and performance advantages of water-based polyurethane compositions, work in this area has continued in an attempt to improve on the performance properties of the water-based polyurethane compositions. By the present invention, there is provided a water-based polyurethane composition with improved performance properties.

SUMMARY OF THE INVENTION

In accordance with the foregoing, the present invention encompasses a stable water-based thermosetting polyurethane composition comprising an unsaturated polyurethane polymer which is a reaction product of: (A) an isocyanate prepolymer which is derived from (i) a polyisocyanate, (ii) an active hydrogen-containing allyl-functional organic compound, (iii) an active hydrogen-containing hydroxy-functional unsaturated organic compound, and (iv) a hydrophilic compound; (B) a chain extender having an active hydrogen group which is more reactive than water, with an isocyanate; wherein the chain extension is conducted in an aqueous medium.

The claimed invention in its broad embodiment encompasses a water-based thermosettable unsaturated polyurethane polymer containing a urethane group and a plurality of internally-crosslinkable ethylenically unsaturated groups comprising an allyl group, and another ethylenically unsaturated group which is reactive with an allyl group. By the term "internally crosslinkable" is meant that the allyl group and other ethylenically unsaturated groups are essentially part of the same molecule and that they react with one another intermolecularly or intramolecularly to produce a thermoset composition of the polyurethane polymer. Additionally, the allyl groups can self-crosslink with each other intermolecularly and intramolecularly to produce the thermoset composition. Crosslinking can occur under photolytic, thermal and/or auto oxidizable free radical initiated reaction conditions to produce a thermoset composition of the polyurethane polymer of this invention. By the term "thermoset" is meant that the composition becomes relatively infusible.

It is a distinct feature of this invention that the polyurethane compositions behave as lacquers. By the term "lacquer" is meant that, on evaporation of solvent, the compositions will yield tack free protective films which are initially thermoplastic. By the term "thermoplastic" is meant that the film has not yet formed an appreciably crosslinked structure. Subsequently and by virtue of the unsaturated internally-crosslinkable groups, the films of the compositions of this invention will thermoset under photolytic, thermal and/or auto-oxidizable free radical initiated reaction conditions.

In the practice of this invention, the water-based thermosetting polyurethane compositions have been found to exhibit a remarkably improved compositional property of stability and film properties of hardness, flexibility, sandability, solvent resistance, water resistance and the like. These and other characteristics and features of the invention are described herein.

Detailed Description of the Invention

The water-based polyurethane composition of this invention comprises a stable, thermosetting unsaturated internally-crosslinkable polyurethane polymer which is a film former. The unsaturated polyurethane polymer can be prepared by reacting an isocyanate prepolymer with a chain extender having active hydrogen groups which are more reactive than water with an isocyanate. The isocyanate prepolymer can be prepared by reacting an organic polyisocyanate such as a polyisocyanate with an active hydrogen-containing allyl functional compound, an active hydrogen-containing hydroxy-functional unsaturated organic compound, a hydrophilic compound and, optionally, a hydroxy-functional saturated organic compound.

The organic polyisocyanate which is useful herein can be an aliphatic or an aromatic polyisocyanate or mixture of the two. Aliphatic Polyisocyanates are preferred because they have been found to provide better color stability in coatings. Diisocyanates are preferred although higher polyisocyanates can be used in combination with diisocyanates and/or monoisocyanates. The average functionality of the reactants used in making the isocyanate-prepolymer is important in controlling the tendency of the polymer to gel. Where higher functionality polyisocyanates are used, some monofunctional isocyanates should be present to reduce the average functionality. An example of suitable higher polyisocyanates is 1,2,4-benzene triisocyanate. Examples of suitable monoisocyanates are cyclohexyl isocyanate, phenyl isocyanate and toluene isocyanate. Examples of suitable aromatic diisocyanates are 4,4'-diphenylmethane diisocyanate, 1,3-phenylene diisocyanate, 1,4-phenylene diisocyanate and tolylene diisocyanate. Examples of suitable aliphatic diisocyanates are straight chain aliphatic diisocyanates such as 2,2,4-trimethyl 1,6-hexamethylene diisocyanate. There can also be employed saturated or unsaturated oligomeric isocyanates such as obtained from, say, maleic anhydride/neopentyl glycol oligomer which is reacted with an isocyanate as set forth above. Cycloaliphatic diisocyanates can be employed. Examples thereof include 1,4-cyclohexyl diisocyanate, isophorone diisocyanate, alpha, alpha-xylylene diisocyanate and 4,4'-methylene-bis(cyclohexylisocyanate). There can also be employed substituted organic polyisocyanates in which the substituents are nitro, chloro, alkoxy and other groups which are not reactive with hydroxyl groups or active hydrogens and provided the substituents are not positioned to render the isocyanate group unreactive.

There can also be employed saturated or unsaturated isocyanate-terminated adducts which can be derived from isocyanates and hydroxyl-containing compounds such as ethylene glycol, 1'4-butylene glycol, polyalkylene glycol, trimethylolpropane diallyl ether, trimethylolpropane monoallyl ether and the like. More than one equivalent of the isocyanate is reacted with one equivalent of the hydroxyl-containing compound.

Thioisocyanates corresponding to the above-described isocyanates can be employed as well as mixed compounds containing both an isocyanate and a thioisocyanate group. The terms "polyisocyanate" and "diisocyanate", as used in the present specification and claims, are intended to cover compounds and adducts containing thioisocyanate groups or isocyanate groups and compounds and adducts containing both isocyanate and thioisocyanate groups.

The active hydrogen-containing allyl functional compounds, useful herein, preferably contain two active hydrogen groups such as hydroxyl groups. Illustrative but non-limiting examples of the active hydrogen-containing allyl functional organic compound can be selected from the group consisting of trimethylolpropane monoallylether, trimethylolpropane diallyl ether, allyl alcohol and allyl glycidyl ether. The reaction of the active hydrogen-containing hydroxy-functional allyl compound can occur during the preparation of the isocyanate prepolymer. Trimethylolpropane monoallyl ether is preferred. As aforestated, for internal-crosslinking, the allyl group reacts with the aforedescribed ethylenically unsaturated group, or with another allyl group.

The useful active hydrogen-containing hydroxy-functional unsaturated organic compound is characterized by an ethylenically unsaturated group which is reactive with an allyl group under free radical initiated conditions. These ethylenically unsaturated groups are referred to as "another" or the "other" unsaturated group in order to distinguish them from allyl groups. Preferably, the active hydrogen comprises another hydroxyl group. Thus, the active hydrogen-containing hydroxyl functional unsaturated organic compound can be a polyol which is typically a polyester polyol. The polyester polyol can be prepared by reacting unsaturated polyacids such as diacids or equivalents thereof with polyols such as diols or equivalents thereof. The diacids or equivalents thereof typically contain from about 2 to 20 carbon atoms or higher and preferably about 2 to 14 carbon atoms. Illustrative but non-limiting examples of the diacids are selected from the group consisting of maleic anhydride and/or fumaric acid, and/or itaconic acid which are preferred.

The diols, useful herein, typically contain from about 2 to 20 carbon atoms or higher and preferably about 2 to 14 carbon atoms. Illustrative but non-limiting examples of the diols are selected from the group consisting of 1,6-hexanediol; neopentyl glycol; 2-methyl propane diol; trimethylol propane monoallyether, 2,2,4-trimethyl-1,3-pentanediol; 1,4-butanediol; cyclohexanediol; cyclohexanedimethanol, and 2,2-dimethyl-3-hydroxypropyl-2,2-dimethyl-3-hydroxypropionate. A non-limiting example of an equivalent of the diols can be as follows. Diepoxides may be considered effectively as diols when reacted with diacids at temperatures below 100° C. to produce equivalent linear polyesters. Monoepoxides may be considered effectively as diols when reacted at temperatures above 100° C. to produce equivalent linear polyesters.

Reaction of the diols and diacids can be conducted as follows. Reaction temperatures of about 150° C. to 200° C. and preferably about 160° C. to 180° C. can be employed over a period of time until an acid value of about 10 mg KOH/gm is attained. In accordance with this invention, it is recommended that necessary steps be taken to preserve the linearity of the resultant polyester since side reactions leading to branched polyesters often occur with unsaturated diacids. If these side reactions are allowed to occur, unwanted gelled products may be obtained in the subsequent urethane formation step. Furthermore, these side reactions reduce the amount of the ethylenically unsaturated groups on the polymer backbone which are required for the film-forming via crosslinking reactions with an allyl group. It may therefore, be necessary to employ in small but effective amounts certain inhibitors, such as di-t-butyl-p-cresol, hydroquinone or benzoquinone, in order to minimize the formation of unwanted branched products. In addition, lower reaction temperatures with azeotropic distillation techniques are employed. The resultant hydroxy-functional unsaturated polyester is said to be essentially linear in that it is essentially difunctional. Typically, the starting reactants consist essentially of difunctional materials.

The ratio of the reactants can be 1:1.1 to 3 and preferably 1:1.2 to 2 equivalents of polyacid to polyol. The reaction is usually conducted in a solvent and in the presence of a catalyst. Examples of the solvents, useful herein, are the higher boiling aromatic solvents such as xylene and toluene. Examples of the catalysts, useful herein, are butyl stannoic acid and dibutyltinoxide.

Generally, the active hydrogen-containing hydroxy-functional unsaturated organic compounds can be substituted or unsubstituted provided that the substituent does not adversely affect the preparation or use of the claimed invention. Typically, the active hydrogen-containing hydroxy-functional unsaturated organic compound has a hydroxyl value of about 20 to 400 and preferably about 40 to 100 mg KOH/gm (using the base catalyzed acetylation method using acetic anhydride). The unsaturation equivalent weight can be from about 300 to 15,000 and preferably from about 500 to 10,000. Molecular weight can be weight average molecular weight of about 300 to 4,000 and preferably about 400 to 2,000. Other active hydrogen-containing hydroxy-functional unsaturated organic compounds, useful herein, can be polyalcohols, polyether polyols, polyurethane polyols, polyamide polyols or a mixture thereof.

The useful hydrophilic compounds are typically isocyanate reactive ionizable compounds. To make the unsaturated polyurethane polymer hydrophilic, an isocyanate reactive compound containing an ionizable group, e.g., a polyol containing an ionizable group such as a carboxyl group can be employed in the preparation of the isocyanate prepolymer. Illustrative but non-limiting examples of the hydrophilic compound can be polyhydroxyalkanoic acid, and preferably dihydroxyalkanoic acids. The acid groups herein, relative to the hydroxyl groups, are relatively inert in their reaction to isocyanate groups. Typically, the useful polyolhydroxyalkanoic acids contain from about 2 to 20 or more, preferably about 2 to 10 carbon atoms. Specific examples thereof can be 2,2-dimethylolpropionic acid, glycolic acid, thioglycolic acid, lactic acid and the like. The acid group can be ionized with a base in an aqueous medium. The useful bases can be ammonia or an amine which is typically a tertiary amine.

It is sometimes desirable to modify the carboxyl groups of the polymer to provide externally crosslinkable sites in the form of say a hydroxyl group. This can be done by reacting some of the carboxyl groups with hydroxyethyl ethyleneimine.

The optional hydroxy-functional saturated organic compound can be a saturated polyol. The saturated polyol can be employed in combination with the above ingredients in their reaction with isocyanates. The useful polyols can be simple diols, or higher molecular weight diols, e.g., polyester Polyols, polyether polyols, polyurethane polyols, polyamide polyols and the like. Polyols with functionally greater than two may be employed to a limited degree and preferably in combination with lower functional polyols.

In preparing the isocyanate prepolymer, art-known techniques can be employed. For example, the polyisocyanate is usually first charged to a suitable reaction vessel, followed by the active hydrogen component, and the mixture may then be heated if necessary until isocyanate has completely reacted with the active hydrogens to produce an isocyanate prepolymer being essentially free of active hydrogens as determined by the product having an essentially constant isocyanate equivalent weight. If desired, catalysts, such as dibutyltin dilaurate, stannous octoate and the like, can be employed to accelerate the reaction. The reaction can take from several minutes to several days depending on the reactivity of the reactants, temperature, presence or absence of catalyst and the like.

Usually, a solvent is employed to facilitate reaction and control of the viscosity of the prepolymer. The viscosity of the prepolymer is extremely important in obtaining a stable dispersion with a finely particulated dispersed phase. The viscosity of the prepolymer can be reduced by heating the neat prepolymer melt, by dissolving the prepolymer in a suitable solvent or preferably, by conducting the isocyanate reaction in a suitable solvent. Conducting the isocyanate reaction in a suitable solvent is preferred because it is an easier way to control prepolymer viscosity. Solvents such as acetonitrile and N-methyl pyrolidone are preferred. Other useful solvents include ketones, tertiary alcohols, ethers, esters, hydrocarbons and chlorocarbons.

When a solvent is employed, it should be present in an amount sufficient to reduce the viscosity of the prepolymer to the required level, at a moderate dispersion. In certain instances, it is desirable to remove the solvent after the polymer is dispersed. In these instances, solvents with high vapor pressure are desirable. Generally, the solvent should be used in an amount of up to 60 percent, and preferably about 3 to 40 percent by weight, based on total weight of the solvent and isocyanate-containing prepolymer.

In preparing the isocyanate prepolymer, the organic polyisocyanate is employed in an amount sufficient to react with the desired amount of the active hydrogen-containing components so as to produce an isocyanate-containing prepolymer. The equivalent ratio of organic polyisocyanate to active hydrogen-containing compound should be at least 1.2:3 and is usually within the range of about 7 to 1.2:1, preferably within the range of about 6 to 1.2:1 and more preferably within the range of about 3 to 1.2:1.

The above isocyanate prepolymer is usually dispersed in an aqueous medium. Usually, the aqueous medium comprises a salt-forming agent and a chain extender. The salt forming agent interacts with the ionizable group of the prepolymer. When the ionizable group is an acid such as a carboxylic acid, the suitable salt forming agent can be a base such as ammonia, and tertiary amines, e.g., triethylamine, or N,N'-dimethylethanolamine. When the ionizable group is a base, the salt forming group is acidic in nature.

The chain extender reacts with the isocyanate prepolymer, preferably in the aqueous medium, to form the unsaturated polyurethane polymer of the invention. The chain extenders useful herein are compounds containing active hydrogens which are more reactive than water is with an isocyanate. The chain extenders are typically polyamines. The amines which can be employed herein can be primary or secondary diamines or polyamines in which the radicals attached to the nitrogen atoms can be saturated or unsaturated, aliphatic, alicyclic, aromatic, aromatic-substituted aliphatic, aliphatic-substituted aromatic or heterocyclic. Mixed amines in which the radicals are different, for example, aromatic and aliphatic can be employed and other non-reactive groups can be present attached to the carbon atom, such as oxygen, sulfur, halogen or nitroso. Exemplary of suitable aliphatic and alicyclic diamines are the following: 1,2-ethylene diamine, 2-methyl-1,5-pentane diamine, 1,2-propylene diamine, 1,8-menthane diaminé, isophorone diamine, propane-2,2-cyclohexyl amine. Aromatic diamines such as the phenylene diamines and the toluene diamines can be employed. Exemplary of the aforesaid amines are: o-phenylene diamine and p-tolylene diamine. N-alkyl and N-aryl derivatives of the above amines can be employed such as, for example, N,N'-dimethyl-o-phenylene diamine, N,N'-di-p-tolyl-m-phenylene diamine and p-aminodiphenylamine. Polynuclear aromatic diamines can be employed in which the aromatic rings are attached by means of a valence bond such as, for example, 4,4'-biphenyl diamine, methylene dianiline and monochloromethylene dianiline. Polyether polyamines such as the "Jeffamines" available from Texaco Chemical Co. can also be used. Polyamines such as diethylene triamine and higher homologs can also be used. Besides the amines mentioned above, hydrazines and hydrazides can also be employed. The equivalent ratio of active hydrogen groups (amine groups) in the chain extender to isocyanate groups in the prepolymer should be about 0.5 to 0.95:1.

To form a finely dispersed stable polyurethane composition, the isocyanate prepolymer should be within the viscosity range of about 50 to 10,000 centipoises, and preferably from about 100 to 5,000 centipoises. Prepolymers within this viscosity range are easy to disperse, requiring only mild agitation. Prepolymers with viscosities higher than 10,000 centipoises are difficult to disperse evenly with higher shear agitation equipment because large or coarse dispersions are formed.

The amount of an aqueous medium employed in the formation of the dispersions of the present invention is important. When too little amount of aqueous medium is employed, mixtures are obtained which are often too thick to handle easily while, on the other hand, dispersions which are too dilute are not economical to handle due to their excessive volume. In general, the aqueous medium will amount to about 15 to 80 percent by weight, preferably about 50 to 80 percent by weight, based on total weight of the prepolymer and the aqueous medium. Water is present in an amount of at least 30 percent, preferably at least 45 percent by weight based on total weight of the aqueous medium with a cosolvent constituting the remainder of the medium. The term "dispersion", as used within the context of the present invention, is believed to be a two-phase aqueous polyurethane system in which the polyurethane is the dispersed phase.

The isocyanate prepolymer can be dispersed in a number of ways. Preferably, the prepolymer, whether neat or as a solution, is added incrementally to the aqueous (dispersing) medium with agitation. Alternately, the aqueous dispersing medium can be added incrementally to the prepolymer with stirring. However, this latter method is less preferred.

The resultant chain-extended unsaturated polyurethane polymer is a high molecular weight, stable, water-based composition which is preferably in the form of a dispersion. By the term "stable" is meant the polyurethane composition of this invention remains ungelled in a hot room at a temperature of 120° F. over a period of seven days. By the term "water-based" is meant that the unsaturated polyurethane polymer of this invention forms a stable dispersion wherein the polyurethane polymer is in a dispersed phase and an aqueous medium is in a continuous phase. As a dispersion, the polyurethane composition is non-sedimenting and even in an instance when settlement of the polyurethane dispersion occurs, it can be readily mixed into water by, say, stirring. The composition should have a viscosity of about 10 to 50,000 centipoises, and preferably from about 20 to 20,000 centipoises in order to be easily handled. Solids content of the composition can be about 20 to 50 percent and preferably about 25 to 40 percent. The composition can be stable and can be essentially emulsifier free. The particle size of the dispersed phase when measured at one percent solids is less than 10, preferably less than 5 microns, and the particles may be spherical or elongated. Molecular weight of the chain-extended unsaturated polyurethane polymer can be of a weight average (Mw) of about 20,000 to 60,000 and preferably about 30,000 to 50,000. The equivalent weight of unsaturated polyurethane polymer based on total unsaturated groups can be from about 300 to 20,000. The equivalent weight based on the allyl group can be from about 500 to 25,000. The equivalent weight based on the other ethylenic unsaturated group can be from about 600 to 30,000.

It is a distinct feature of the invention that one can form a low VOC (volatile organic content) composition with the water-based polyurethane polymer of this invention. The VOC can be from about 0.5 to 4 and usually about 1.5 to 3 pounds per gallon (calculated).

The stable water-based polyurethane compositions of this invention can be cured by air-drying, heating, irradiating or a combination thereof to produce a thermoset film which exhibits good solvent resistance. By solvent resistance is meant that the film is resistant to substantial dissolution or degradation when exposed to, say, methyl ethyl ketone. The polyurethane composition of this invention forms tack-free films at ambient temperatures on a variety of substrates such as wood, metal or plastic and the like.

In the instance of curing by air-drying, the polyurethane composition at a film thickness of about 0.5 to 3 mils can air dry over a period of half hour to one week to form a cured thermoset film in that it takes more than 20 solvent (methyl ethyl ketone) double rubs to remove the cured film.

In the instances of curing by heating, the polyurethane composition can be cured by force-drying at relatively low temperatures, or baked to cure at elevated temperatures. Hence, cure temperatures can be from about 110° F. to 325° F. over a period of 10 to 40 minutes. The films obtained thereby at a 1 to 3 mil thickness are solvent resistant in that it takes more than 25 solvent double-rubs (methyl ethyl ketone) and even over 200 double rubs depending on the cure conditions to remove the film.

A catalyst such as a metal compound and/or a free radical catalyst such as peroxy compound could be employed herein. An example of the metal compound can be cobalt acetate, cobalt octoate, cobalt naphthanate, cobalt complexes, copper complexes, calcium complexes, zirconium complexes, manganese acetate and the like. An example of the peroxy compound can be methyl ethyl ketone peroxide, cumene hydroperoxide, t-butylhydroperoxide and the like.

The polyurethane compositions can be exposed to actinic radiation to produce a cured film. Irradiation can be performed using the known radiation curing equipment such as mercury arc lamps or electron beam. The exposure time required to cure the composition varies somewhat depending on the specific formulation, type and wavelength of radiation, energy flux, nature and concentration of photoinitiator and film thickness. Generally, the cure schedule using mercury arc lamps is about 20 feet per minute using 4 lamps each operating at 300 watts per inch, situated at about 10 inches apart. The photoinitiators useful herein can be 2,2-dimethoxy, 2-phenylacetophenone; 2,2-diethoxy acetophenone; 2-hydroxy-2,2-dimethoxy acetophenone; benzophenone and the like at a concentration of about 1 to 4 and preferably about 1.5 to 2.5 percent based on solid resin.

The radiation cured film is solvent resistant, in that it takes 25 and preferably greater than 100 solvent rubs (methyl ethyl ketone) to remove the films. Because of the nature of the polyurethane compositions, the radiation cured films can post-cure under ambient conditions to provide films of increased solvent resistance. To facilitate this post cure, catalysts such as metal compounds described above may be used in addition to the photoinitiators.

The low temperature curable polyurethane compositions are particularly suited to application over parts that are sensitive to high temperature bake. Examples of high temperature sensitive parts can be plastic and wood. The polyurethane composition is particularly useful as a radiation curable wood coating. It is a distinct feature of the invention that as a wood coating, the polyurethane composition can be partially but effectively cured at a low temperature (125° to 150° F.) for 15 to 30 minutes to produce a solvent resistant coating of about 20 to 25 solvent rubs. At this stage, the coating is sufficiently cured and can be sanded, rubbed and polished to improve the surface appearance thereof. Subsequently, the coating can be UV cured to maximize to the degree of crosslinking in the polymer to yield a hard, solvent resistant (greater than 100 solvent double rubs) films.

Additional crosslinking or curing agents may be employed with the polyurethane composition. Examples of the additional crosslinking curing agents would be aminoplast resins, formaldehyde, phenolic resins, alkoxysilanes, organic polyisocyanates which are masked, or blocked isocyanates, epoxy-containing organic materials, water dispersed urethane acrylates, and water dispersed unsaturated polyesters. Chelating agents such as zirconium compounds may also be added. Water-soluble crosslinking agents such as aminoplasts, formaldehydes and phenolics are simply added to the finished dispersion, whereas more hydrophobic materials such as some organic isocyanates, and some epoxy-containing organic materials are preferably dissolved or emulsified in a solvent which is compatible with water and polyurethane without separating into two layers when mixed. The curing agents can be employed to cure polyurethane polymers containing free hydroxyl or amine groups. Self-crosslinking external curing agents can be employed as well. The amount of additional crosslinking curing agents used would depend primarily on the final properties desired in the cured polymer film. A cure catalyst such as p-toluene sulfonic acid can be used.

The polyurethane compositions which are curable at elevated temperatures are particularly suitable as primer coatings. It is a distinct feature of the invention that the primer coating of this invention can be cured at a temperature of 180 to 280 over 20 to 40 minutes to produce a cured coating having excellent sandability, high gloss, distinctness of image (DOI), chip resistance, humidity resistance and durability.

In addition to the components mentioned above, the polyurethane composition ordinarily contains optional ingredients, including any of the various pigments ordinarily utilized in coatings. In addition, various fillers, plasticizers, anti-oxidants, flow control agents, surfactants and other such formulating additives can be employed. Although the products of the invention can be dispersed without the aid of conventional surfactants or emulsifying agents, it may be desirable in certain instances to add a surfactant or emulsifying agent to the dispersion for the purpose of effecting the final properties of the coating composition.

The polyurethane composition herein can be applied by any conventional method, including brushing, dipping, curtain coating, roll coating, flow coating, electrodeposition, electrostatic spraying and the like. The coatings of the present invention can be applied over virtually any substrate, including wood, metal, glass, cloth, plastic, foam and the like. The compositions disclosed herein can be added to other water-compatible compositions to improve flexibility, hardness, drying, solvent resistance, sandability and other coating properties.

These and other aspects of the invention are further illustrated by the following non limiting examples.

EXAMPLE 1

The water-based polyurethane composition of the invention was prepared as follows:

A) Polyester Synthesis

Into a 5 liter round bottomed flask equipped with an air-driven mechanical stirrer, nitrogen inlet tube, Dean-Stark apparatus and steam condenser were placed the following:

| Ingredients | Weight (grams) |
|---|---|
| 2-Methyl propanediol | 2205 |
| Maleic Anhydride | 2144 |
| Dibutyltin oxide | 7 |
| Triphenyl phosphite | 7 |
| Xylene | 233 |

The resultant mixture was heated to a maximum temperature of 187° C. and the water of distillation was removed until the acid value was reduced to a level <6.0. The final acid value of the polyester mixture was 5.57 and the measured hydroxyl value was 79.77 mg KOH/gm resin.

B) Isocyanate Prepolymer

Into a 5 liter round bottomed flask equipped with a nitrogen inlet tube and mechanical stirrer were placed the following:

| Ingredients | Weight (grams) |
|---|---|
| TERATHANE 2000 Polyether Diol[1] | 473.0 |
| Polyester of Example 1A | 94.6 |
| Trimethylolpropane Monoallyl ether | 236.5 |
| Dimethylol propionic acid | 381.8 |
| m-TMXDI[2] | 1811.9 |
| Acetonitrile | 1000.0 |
| Dibutyltin dilaurate | 3.0 |

[1] Polyether diol available from E. I. DuPont de Nemours.
[2] Meta-tetramethyl xylene diisocyanate available from American Cyanamid.

The resultant mixture was heated to a maximum temperature of 75° C. over a seven hour time period. Final acid value and final isocyanate equivalent weight were measured to be 40.6 and 715, respectively. The prepolymer had a total solids content of 70.4%.

C) Dispersion

Into a 5 liter flask equipped with a nitrogen inlet were charged the following:

| Ingredients | Weight (grams) |
|---|---|
| Deionized Water | 1848.3 |
| Ethylene diamine | 39.9 |
| 28% Aqueous Ammonium Hydroxide | 42.4 |

The resultant mixture was stirred at ambient temperature while a total of 1,000 grams of the isocyanate prepolymer from Example 1B was slowly added to form a stable dispersion. The total time for the addition was one hour and the maximum exotherm temperature was 50° C. The dispersion had a total solids of 29.9% and an "A-" Gardner-Holdt viscosity upon cooling.

The flask was then fitted with a nitrogen inlet and vacuum distillation apparatus and 0.25 grams of "Foamkill 649" defoamer (available from Crucible Chemicals) was added to the dispersion. The resultant mixture was heated to 50° C. with stirring under vacuum. The residual volatile organic solvent was then removed by vacuum distillation to yield a dispersion with a total solids content of 41.2% and a Brookfield viscosity of 196 centipoises.

EXAMPLE 2

The water-based polyurethane composition of the present invention was prepared as follows:

A) Polyester Synthesis

Into a 5 liter round bottomed flask equipped with a mechanical stirrer, nitrogen inlet tube, Dean Stark apparatus, and steam condenser were placed the following:

| Ingredients | Weight (grams) |
| --- | --- |
| Deionized Water | 174 |
| Neopentyl Glycol | 1260 |
| Dimethylol propionic acid | 306 |
| Dodecanedioic acid | 1260 |
| Fumaric Acid | 720 |
| "Ionol"[1] | 1 |
| Triphenyl phosphite | 2 |
| Dibutyl tin oxide | 2 |
| Xylene | 93 |

[1] di-t-butyl p-cresol, available from Shell Chemical Co.

The mixture of the above ingredients was heated to a maximum temperature of 170° C. and water was continuously removed. The final acid value and hydroxyl value were 45.4 and 50.4, respectively.

B) Isocyanate Prepolymer

Into a 1 liter round bottomed flask equipped with a nitrogen inlet and condenser were placed the following:

| Ingredients | Weight (grams) |
| --- | --- |
| Trimethylolpropane Monoallyl ether | 48 |
| PCP 0200[1] | 26 |
| Polyester of Example 2A | 155 |
| PCP 0301[2] | 10 |
| Dimethylolpropionic acid | 26 |
| Isophorone diisocyanate | 290 |
| Acetonitrile | 182 |
| Dibutyltin dilaurate | 0.3 |

[1] Polycaprolactone diol available from Union Carbide Co.
[2] Polycaprolactone triol available from Union Carbide Co.

The mixture of the above ingredients was heated to 75° C. with stirring to a final acid value and isocyanate equivalent weight of 25.2 and 639.2, respectively.

C) Dispersion

Into a 3 liter round bottomed flask equipped with a mechanical stirrer and nitrogen inlet were placed the following:

| Ingredients | Weight (grams) |
| --- | --- |
| Deionized Water | 1231.0 |
| Dimethylethanolamine | 24.0 |
| Ethylenediamine | 26.8 |

The mixture of the above ingredients was heated to 70° C. and 1,272 grams of isocyanate prepolymer from example 2B were added slowly with good agitation. After the addition was complete, the residual organic solvent was removed by vacuum distillation to produce a dispersion having a total solids content of 26.2 percent and a Brookfield viscosity of 320 cps.

EXAMPLE 3

An aqueous air drying/forced curable coating composition of this invention was formed from the following mixture:

| Material | Weight (grams) | Resin Solids | Pigment Solids |
| --- | --- | --- | --- |
| Polyurethane from Example 1C | 227.3 | 82.3 | |
| Butyl Cellosolve | 10.0 | | |
| Aqueous cobalt drier Solution[1] | 9.44 | 0.17 | |
| Aqueous pigment[2] dispersion (AQI-1076) | 149.3 | 9.0 | 100.0 |
| Ammonium Benzoate (10% aqueous) | 10.0 | 1.0 | |
| | 415.0 | 100.0 | 100.0 |

[1] The cobalt drier solution was prepared from:
33.3 grams Cobalt Hydrocure II (Cobalt Neodecanoate available from Mooney Chemicals Inc.)
11.8 grams Butyl Carbitol
59.0 grams Butyl Cellosolve
[2] A waterborne titanium dioxide dispersion purchased from Cardinal Color Co.

The resultant coating composition had a total solids of 43.8% and a #2 Zahn Cup Viscosity of 23 seconds.

A film (1.7 mils) formed from this coating composition (15 min. at 150° F.) possessed an H pencil hardness, passed 100 in/lb reverse and direct impact test, exhibited cross-hatch adhesion (no loss of coating) and withstood 200 acetone double rubs.

EXAMPLE 4

A water-based polyurethane composition of this invention was prepared and used as follows:

A) Polyester Synthesis

Into a 3-liter flask equipped with a mechanical stirrer, nitrogen blanket inlet tube, condenser, and Dean Stark apparatus were placed the following:

| Ingredients | Weight (grams) |
| --- | --- |
| 2-Methyl propanediol | 1109.0 |
| Fumaric Acid | 1267.0 |
| Dibutyltin oxide | 3.5 |
| Triphenyl phosphite | 3.5 |
| Xylene | 125.0 |

The resultant mixture was heated to a maximum temperature of 175° C. and water was removed by distillation until the acid value was <5.0. The final results for the acid value and the total solids were 4.59 and 95.95%, respectively.

B) Polyester Synthesis

Into a 5-liter flask equipped with mechanical stirrer, nitrogen inlet tube, condenser, and Dean Stark apparatus were placed the following:

| Ingredients | Weight (grams) |
| --- | --- |
| 2-Methyl propanediol | 2205.0 |
| Maleic Anhydride | 2143.8 |
| Dibutyltin oxide | 7.0 |
| Triphenyl phosphite | 7.0 |
| Xylene | 232.8 |
| Methyl hydroquinone | 0.5 |

The same procedure as was used in Example 4A was employed in this example to provide a polyester with acid value 6.57, hydroxyl value 70.67, and a total solids of 96.65%.

C) Polyurethane Allyl Ether Oligomer

Into a 2-liter flask equipped with a mechanical stirrer were placed the following:

| Ingredients | Weight (grams) |
| --- | --- |
| Polyester from Example 4B | 800.0 |
| Isophorone Diisocyanate | 222.0 |
| Acetonitrile | 365.0 |

The resultant mixture was heated at a temperature of 70° C. until the NCO equivalent weight was constant. At this point 228.0 grams of trimethylol propane (TMP) Diallylether, 0.1 grams of methyl hydroquinone and 1.25 grams of dibutyltin dilaurate were added to the flask and the mixture was heated at 70° C. until the isocyanate was consumed as shown by infrared spectroscopy.

D) Polyester Synthesis

Into a 5-liter flask equipped with a mechanical stirrer, nitrogen inlet tube, condenser, and Dean Stark apparatus were placed the following:

| Ingredients | Weight (grams) |
| --- | --- |
| Deionized Water | 174.0 |
| Neopentyl glycol | 1260.0 |
| Dimethylol propionic acid | 306.0 |
| Dodecanedioic acid | 1260.0 |
| Fumaric Acid | 720.0 |
| Ionol | 1.0 |
| Triphenyl phosphite | 2.0 |
| Dibutyltin oxide | 2.0 |
| Xylene | 93.4 |

The resultant mixture was heated to a maximum temperature of 160° C. and water was removed by distillation to a final acid value of 43.3. The hydroxyl value was 94.9 and the total solids was 96.3%.

E) Isocyanate Prepolymer

Into a 3-liter flask equipped with a mechanical stirrer and condenser were placed the following:

| Ingredients | Weight (grams) |
| --- | --- |
| Trimethylol propane Monoallyl Ether | 205.0 |
| Polyester from Example 4A | 138.7 |
| Acid Functional Polyester from Example 4D | 276.2 |
| Dimethylolpropionic Acid | 82.1 |
| Isophorone Diisocyanate | 717.0 |
| Acetronitrile | 479.0 |
| Dibutyltin dilaurate | 1.0 |

The resultant mixture was heated to a maximum temperature of 73° C. until the NCO equivalent weight was constant. At this point 17.8 grams of "Tone 0301" (300 molecular weight, polyether polyol from Union Carbide) was added to the mixture and the temperature was maintained at 70° C. until the NCO equivalent was constant. The final solids content was 76.36%, the acid value was 24.49, and the NCO equivalent weight was 991.8.

F) Dispersion

Into a 12-liter flask equipped with a mechanical stirrer and vacuum distillation apparatus were placed the following:

| Ingredients | Weight (grams) |
| --- | --- |
| Deionized Water | 2729.8 |
| Ethylene Diamine | 35.2 |
| Dimethyl ethanolamine | 52.2 |

The mixture was heated to 70° C., and a mixture of 1,500 grams of prepolymer from Example 4E and 500 grams of polyurethane allyl ether oligomer from Example 4C was added with efficient stirring. After dispersion the mixture was cooled and 0.25 grams of Foamkill 649 available from Crucible Chemicals was added. The solvent was then removed by vacuum distillation to yield a dispersion having a total solids content of 35.96%, a Brookfield Viscosity of 160 cps (#4 spindle ⅞ 20 rpm), and a pH of 8.10.

EXAMPLE 5

A water-based air drying/force curable coating composition was prepared as shown below:

| Material | Weight (grams) | Resin Solids | Pigment Solids |
| --- | --- | --- | --- |
| Aqueous polyurethane from Example 4F | 248.4 | 89.33 | |
| Aqueous Drier from from Example 3 | 9.44 | 0.17 | |
| "Acrysol"[1] | 3.7 | 0.50 | |
| Aqueous Pigment Dispersion from Example 3 | 149.3 | 9.00 | 100.0 |
| Ammonium Benzoate (10% aqueous) | 10.0 | 1.00 | |
| | 431.8 | 100.0 | 100.0 |

[1]Acrylic polymer available from Rohm and Haas Co.

A resulting coating composition had a total solids content of 30.4% and a #2 Zahn Cup Viscosity of 30 seconds.

The properties obtained for a 1.1 mil film formed from this coating composition (15 min at 150° F.) are listed below:

| | |
| --- | --- |
| Pencil hardness (out of oven) | HB |
| Acetone Resistance | 23 double rubs |
| Cross-Hatch Adhesion | no loss of coating |
| Direct Impact Resistance | 100 in-lbs |
| Humidity Resistance (1000 hr) | Pass (no blistering) |

EXAMPLE 6

The water-based polyurethane composition of the invention was prepared and used as follows:

A) Polyester Synthesis

Into a 5-liter flask equipped with a nitrogen inlet tube, mechanical stirrer, condenser, and Dean Stark apparatus were charged the following:

| Ingredients | Weight (grams) |
| --- | --- |
| 1,6-Hexanediol | 947.7 |
| Maleic Anhydride | 524.7 |

-continued

| Ingredients | Weight (grams) |
|---|---|
| Adipic Acid | 781.8 |
| 2-Methyl 1,3-Propanediol | 738.9 |
| Triphenyl phosphite | 1.5 |
| Dibutyltin oxide | 1.5 |
| Xylene | 177 |

The resultant mixture was heated to a maximum temperature of 180° C. and water was removed by distillation until the acid value was <5.0.

B) Isocyanate Prepolymer

Into a 5-liter flask equipped with a nitrogen inlet tube, mechanical stirrer and a condenser were charged the following:

| Ingredients | Weight (grams) |
|---|---|
| TERATHANE 2000 Polyether Diol | 753.0 |
| Polyester from Example 6A | 247.5 |
| Trimethylolpropane diallyl ether | 200.5 |
| Dimethylol propionic acid | 232.5 |
| DESMODUR W[1] | 1366.5 |
| Acetonitrile | 900.5 |
| Dibutyltin dilaurate | 1.0 |

[1] Methylene bis-4,4'-(cyclohexyl isocyanate) available from Mobay Corp.

The resultant mixture was heated with agitation at 77° C. until the isocyanate equivalent weight was constant. The acid value of the prepolymer was 27.17, the total solids was 75.61%, and the isocyanate equivalent weight was 882.8.

C) Dispersion

Into a 12-liter flask equipped with a mechanical stirrer, condenser and vacuum distillation apparatus were placed the following:

| Ingredients | Weight (grams) |
|---|---|
| Deionized Water | 4980.3 |
| Ethylene diamine | 87.2 |
| 28% Aqueous Ammonium Hydroxide | 76.8 |

The resultant mixture was heated to 70° C. and 2,700 grams of the isocyanate prepolymer from Example 6B was added slowly the mixture with vigorous agitation.

After dispersion was complete, the solvent was removed by vacuum distillation to yield an aqueous polyurethane dispersion with a total solids of 30.79%, a Brookfield viscosity of 37 cps (#3 spindle, 100 rpm), and a pH of 7.98.

EXAMPLE 7

A water-based coating composition containing the polyurethane lacquer of this invention was prepared and evaluated as follows:

7A) Pigment Dispersion

| Material | Weight (grams) | Resin Solids | Pigment Solids |
|---|---|---|---|
| Butyl Carbitol | 52.94 | — | — |
| Hexyl Cellosolve | 52.94 | — | — |
| Aqueous Polyurethane[1] (WRX-3671) | 350.83 | 119.28 | — |
| Water | 254.12 | — | — |
| Titanium Dioxide | 506.34 | — | 506.34 |

[1] WRX-3671 is a waterborne polyurethane pigment dispersing vehicle available from PPG Industries.

7B) Coating Composition

| Material | Weight (grams) | Resin Solids | Pigment Solids |
|---|---|---|---|
| Aqueous Polyurethane | 115.2 | 35 | — |
| Cobalt Hydrocure II[1] | 0.7 | 0.035 | — |
| Butyl Carbitol | 8.6 | — | — |
| Pigment Dispersion of Example 7A above | 42.1 | 3.9 | 17.5 |
| 50% aqueous Acrysol solution thickner[2] | 3.9 | 0.525 | — |

[1] Cobalt neodecanoate available from Mooney Chemicals, Inc.
[2] An acrylic polymer available from Rohm & Haas Co.

The above materials for the pigment dispersion were mixed in the listed order and ground in zircoa beads to a "Hegman" scale of 7.5. The pigment dispersion was blended with the above ingredients in the listed order under the subheading of "coating composition". The resultant coating composition had a solids content of 33.4 percent and viscosity of 22 seconds (No. 4 Ford cup).

The above coating was spray applied to E-coated steel (with a cationic electrodeposition composition available from PPG Industries, Inc. as "ED-4"), cured and evaluated as follows:

| Forced Flash | 5 Minutes at 120° F. |
|---|---|
| Bake Schedule | 10 Minutes at 250° F. |
| Dry Film Thickness | 1.3 Mils |
| Pencil Hardness | 3 H |
| Chip Resistance | 8[1] |
| Solvent Resistance | 230[2] |
| Sandability | Excellent[3] |

[1] ASTM Method SAE J-400.
[2] Methyl ethyl ketone double-rubs.
[3] 400 grit sandpaper was used; there was no paper fill, no grabbing, and very good telegraph resistance was observed.

EXAMPLE 8

The water-based polyurethane lacquer coating composition of this invention was prepared and evaluated as follows:

| Ingredients | Weight (grams) | Resin Solids |
|---|---|---|
| Polyurethane Resin with the same composition as in Example 2C | 9412 | 3218.8 |

Add the following slowly with agitation in the listed order.

| | | |
|---|---|---|
| Butyl Carbitol | 322 | — |
| "Darocur 1173" Photoinitiator[1] | 64.4 | 64.4 |
| "Byk 341" Surfactant[2] | 32.2 | 32.2 |
| "Slip-Ayd SL-300" wax[3] | 215 | 64.4 |
| "UCAR Filmer IBT Film-Former"[4] | 32.2 | — |
| "Natrosol Plus 330 PA" solution[5] | 805 | 16.1 |
| n-Propanol | 1005 | — |

-continued

| Water | 2744 |

[1] 3-hydroxy-2,2-dimethoxyacetophenone available from EM Industries.
[2] Dimethylpolysiloxane (polyether modified) available from Byk-Chemie.
[3] Polyethylene dispersion available from Daniels Products.
[4] 2,2,4-trimethyl pentanediol isobutyrate available from Union Carbide.
[5] Hydroxy Ethyl Cellulose from Aqualon Co. This is a 2% solution in water.

The above ingredients were mixed in the listed order to produce a coating having a solids content of 23.2 percent and viscosity 15 seconds (with a No. 2 Zahn cup).

The resultant coating was employed as a topcoat and sprayed on oak veneer substrate. A stain solution was first spray applied to the substrate. This stain solution comprised of about 1 part each of N9-23, N9-24 and N9-25 dye (available from Snyder Brothers Co) in 97 parts methanol. After a five minute flash, a polyurethane base coat A 281Z40 available from PPG Industries, Inc. was spray applied, flashed for 2 minutes and baked for 5 minutes at 135° F. The coating of example 8A was then spray applied as the topcoat. After spraying there was a two-minute flash at room temperature and then a five minute bake at 135° F. Following the bake, the topcoat was UV cured (four lamps, 300 watts per inch at a distance of about 10 inches apart, 80 feet/minute, 10-inch lamp height, four passes).

The cured coating passed substantially all of the NKCA (National Kitchen Cabinet Association) specifications. The topcoat had good toughness on wood and 180 MEK double rubs on metal.

While the illustrative embodiments of the invention have been described hereinabove, it will be understood that various modifications will be apparent to and can be made by those skilled in the art without departing from the scope or spirit of the invention. Accordingly, it is intended that the claims directed to the invention be construed as encompassing all aspects of the invention which would be treated as equivalents by those skilled in the art to which the invention pertains.

Therefore what is claimed is:

1. A stable water-based thermosetting polyurethane composition containing an unsaturated polyurethane polymer having a molecular weight of 20,000 to 60,000 and having a plurality of internally-crosslinkable unsaturated groups comprising an effective combination of allyl groups laterally pendant at plural locations along the length of the polyurethane polymer backbone and another ethylenically unsaturated group within the polyurethane polymer backbone which is reactive with the allyl group to form a solvent-resistant film.

2. The stable water-based thermosetting polyurethane composition of claim 1 wherein the equivalent weight based on total unsaturated groups is from about 300 to 20,000.

3. The stable water-based thermosetting polyurethane composition of claim 1 wherein the equivalent weight based on the allyl group is from about 500 to 25,000.

4. The stable water-based thermosetting polyurethane composition of claim 1 wherein the allyl group is derived from trimethylolpropane monoallyl ether.

5. The stable water-based thermosetting polyurethane composition of claim 1 wherein the equivalent weight based on the unsaturated group within the backbone is about 600 to 30,000.

6. The stable water-based thermosetting polyurethane composition of claim 1 wherein the unsaturated group within the backbone is derived from diacids of the group consisting of maleic, fumaric, and itaconic acids and anhydrides and mixtures thereof.

7. A stable water-based thermosetting polyurethane composition which is a reaction product of:
   (A) an isocyanate prepolymer which is derived from
      (i) a polyisocyanate,
      (ii) an allyl functional organic compound the preponderance of which contains at least two isocyanate reactive hydrogen-containing groups,
      (iii) an active hydrogen-containing hydroxy functional unsaturated organic compound, and
      (iv) a hydrophilic compound;
   (B) a chain extender having an active hydrogen group which is more reactive than water with an isocyanate, wherein the chain extension takes place in an aqueous medium, and wherein the resulting molecular weight of the polyurethane is 20,000 to 60,000.

8. The stable water-based thermosetting polyurethane composition of claim 7 wherein the polyisocyanate is a diisocyanate selected from the group consisting of toluene diisocyanate, isophorone diisocyanate, tetramethylxylene diisocyanate, dicyclohexylmethane diisocyanate, trimethyl, 1,6 hexamethylene diisocyanate, cyclohexyldiisocyanate and a mixture thereof.

9. The stable water-based thermosetting polyurethane composition of claim 7 wherein the equivalent ratio of isocyanate to hydroxyl group is about 1.2 to 3:1.

10. The stable water-based thermosetting polyurethane composition of claim 7 wherein the active hydrogen-containing allyl functional organic compound is trimethylolpropane monoallyl ether.

11. The stable water-based thermosetting polyurethane composition of claim 7 wherein the equivalent weight based on allyl groups is from about 500 to 25,000.

12. The stable water-based thermosetting polyurethane composition of claim 7 wherein the active hydrogen-containing hydroxy-functional unsaturated organic compound is derived from an ethylenically unsaturated compound selected from diacids of the group consisting of maleic, fumaric, and itaconic acids and anhydrides and mixtures thereof.

13. The stable water-based thermosetting polyurethane composition of claim 7 wherein the active hydrogen-containing hydroxy-functional unsaturated organic compound is derived from an ethylenically unsaturated compound selected from diacids of the group consisting of fumaric and maleic acids and anhydrides and mixtures thereof.

14. The stable water-based thermosetting polyurethane composition of claim 7 wherein the unsaturation equivalent weight of the active hydrogen-containing hydroxy-functional unsaturated organic compound is about 200 to 15,000.

15. The stable water-based thermosetting polyurethane composition of claim 7 wherein the active hydrogen-containing hydroxy-functional unsaturated organic compound is a polyester, a polyether, a polyurethane or a polyamide.

16. The stable water-based thermosetting polyurethane composition of claim 7 wherein the hydrophilic compound is an isocyanate reactive compound containing an ionizable group.

17. The stable water-based thermosetting polyurethane composition of claim 16 wherein the ionizable group is a carboxyl group.

18. The stable water-based thermosetting polyurethane composition of claim 7 wherein the hydrophilic compound is selected from the group consisting of dimethylolproponic acid, glycolic acid, thioglycolic acid and lactic acid.

19. The stable water-based thermosetting polyurethane composition of claim 18 wherein the hydrophilic compound is dimethylolpropionic acid.

20. The stable water-based thermosetting polyurethane composition of claim 7 wherein the chain extender is selected from the group consisting of 1,2-ethylene diamine, isophorone diamine, 1,8-menthane diamine, hydrazine and a mixture thereof.

21. The stable water-based thermosetting polyurethane composition of claim 20 wherein the chain-extender is 1,2-ethylenediamine.

22. An ambient temperature curable coating composition containing the water-based thermosetting polyurethane composition of claim 1 and a cure catalyst.

23. An ambient temperature curable coating composition of claim 22 wherein the catalyst is selected from the group comprising of a cobalt salt, a manganese salt and a peroxide initiator and a mixture thereof.

24. A radiation curable coating composition comprising the thermosetting polyurethane composition of claim 1 and photoinitiator.

25. A radiation curable coating composition comprising the thermosetting polyurethane composition of claim 1, a metal catalyst and photoinitiator.

26. A heat-curable coating composition comprising the thermosetting polyurethane composition of claim 1 and an aminoplast or isocyanate.

27. The stable water-based thermosetting polyurethane composition of claim 1 wherein the molecular weight of the polyurethane polymer is 30,000 to 50,000.

28. The stable water-based thermosetting polyurethane composition of claim 7 wherein the molecular weight of the polyurethane polymer is 30,000 to 50,000.

* * * * *